United States Patent
Fujimori

(10) Patent No.: US 6,288,628 B1
(45) Date of Patent: *Sep. 11, 2001

(54) DISPLAY UNIT FOR SELECTIVE CALLING RECEIVER

(75) Inventor: Kazuhiko Fujimori, Kanagawa (JP)

(73) Assignee: Matsushita Electric Industrial Co., Ltd., Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/876,519

(22) Filed: Jun. 16, 1997

(30) Foreign Application Priority Data

Jun. 19, 1996 (JP) ................................... 8-158394

(51) Int. Cl.$^7$ ...................................... H04Q 7/00
(52) U.S. Cl. .................... 340/7.2; 379/396; 379/376; 455/574; 345/102
(58) Field of Search ............... 340/825.44, 7.2; 379/396, 376; 455/567, 574; 345/102; 362/20

(56) References Cited

U.S. PATENT DOCUMENTS

| | | | |
|---|---|---|---|
| 4,281,365 | * 7/1981 | Elving et al. | 362/20 |
| 4,644,350 | * 2/1987 | Ishii | 340/825.44 |
| 4,713,659 | * 12/1987 | Oyagi et al. | 340/825.44 |
| 4,841,164 | * 6/1989 | Basso | 307/117 |
| 5,398,022 | * 3/1995 | Lipp | 340/825.44 |
| 5,493,280 | * 2/1996 | Shibayama | 340/825.44 |
| 5,548,832 | * 8/1996 | Karam | 455/38.3 |
| 5,570,421 | * 10/1996 | Morishima | 379/396 |
| 5,635,915 | * 6/1997 | Gray | 340/825.57 |
| 5,933,089 | * 8/1999 | Katada | 340/825.44 |

FOREIGN PATENT DOCUMENTS 57-103087 * 9/1982 (JP).
05-167506 * 7/1993 (JP).

* cited by examiner

Primary Examiner—Michael Horabik
Assistant Examiner—Yves Dalencourt
(74) Attorney, Agent, or Firm—Pearne & Gordon LLP

(57) ABSTRACT

A selective calling receiver display unit having a displaying function, which including a photo-detecting section for detecting the quantity of light of an incident light beam, and a display control section for processing the display action of a display section. The display control section controls the on-off operation of the screen display of the display section according to the quantity of light detected by the photo-detecting section, so that the screen display is automatically turned on and off according to the necessity for screen display which is based on the use of the selective calling receiver.

3 Claims, 4 Drawing Sheets

DISPLAY UNIT FOR SELECTIVE CALLING RECEIVER

BACKGROUND OF THE INVENTION

This invention relates to a display unit in a selective calling receiver such as a pager (hereinafter referred to as "a selective calling receiver display unit", when applicable) which has a function of displaying messages etc.

Recently, in a selective calling receiver, its power consumption has been greatly reduced; that is, an improvement of current decreasing means has been a problem to be solved. In this connection, a selective calling receiver having a timer or switch has been known in the art. In the case of a selective calling receiver having a timer, as shown in a flow chart of FIG. 4A, when the screen display is turned on (signal arrival time), the timer is started, and when a time-out occurs, the timer operates to turn off the screen display. On the other hand, in the case of a selective calling receiver having a switch, as shown in a flow chart of FIG. 4B, the screen display is kept turned off as long as the switch is depressed, and upon arrival of a signal, the user turns on the switch, and after the signal has been read, the switch is turned off.

The above-described conventional selective calling receiver having a timer or switch suffers from the following problems. The user must turn off the screen display. In addition, although it is necessary for the user to watch the screen display, the timer is operated to turn off the screen display.

SUMMARY OF THE INVENTION

Accordingly, an object of the invention is to eliminate the above-described difficulties accompanying a conventional selective calling receiver.

More specifically, an object of the invention is to provider a selective calling receiver display unit in which the screen display is automatically turned on and off according to the necessity for screen display which is based on the use of the selective calling receiver.

The foregoing object of the invention has been achieved by the provision of a selective calling receiver display unit which has a displaying function, which, according to the invention, comprises: photo-detecting means for detecting a quantity of light of an incident light beam; and display processing means for processing the display action of a display section, the display processing means controlling the on-off operation of a screen display of the display section according to the quantity of light detected by the photo-detecting means.

With the selective calling receiver display unit, the screen display is automatically turned on and off according to the necessity for screen display which is based on the use of the selective calling receiver.

DETAILED DESCRIPTION OF THE INVENTION

A display unit in a selective calling receiver, which constitutes a preferred embodiment of the invention, will be described with reference to the accompanying drawings.

Figure 1:
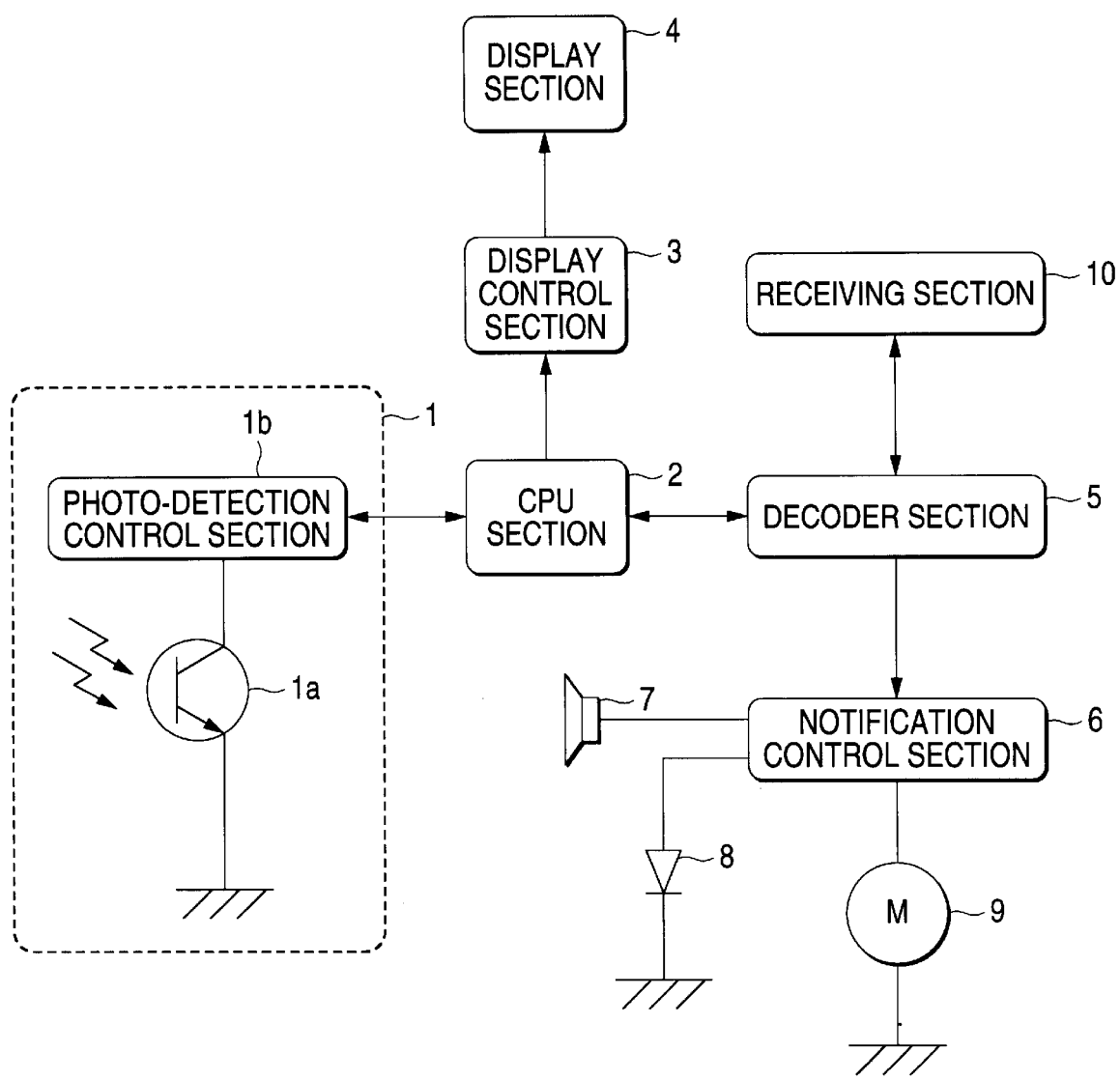
FIG. 1 is a block diagram showing the arrangement of a selective calling receiver, which constitutes a preferred embodiment of the invention.

In FIG. 1, reference numeral 1 designates a photo-detector section comprising a photo-detecting element 1a, and a photo-detection control section 1b; 2, a CPU section which decides the result of detection by the photo-detector section, to control other control sections; 3, a display control section; 4, a display section; 5, a decoder section; and 6, a notification control section; and 10, a signal receiving section. The notification control section 6 controls a sound generating section 7 as a sound-operated notifying function, an LED section 8 as a light-operated notifying function, and a motor section 9 as a vibration-operated notifying function. The signal receiving section 10 is to receive a calling signal from outside.

Figure 2A:
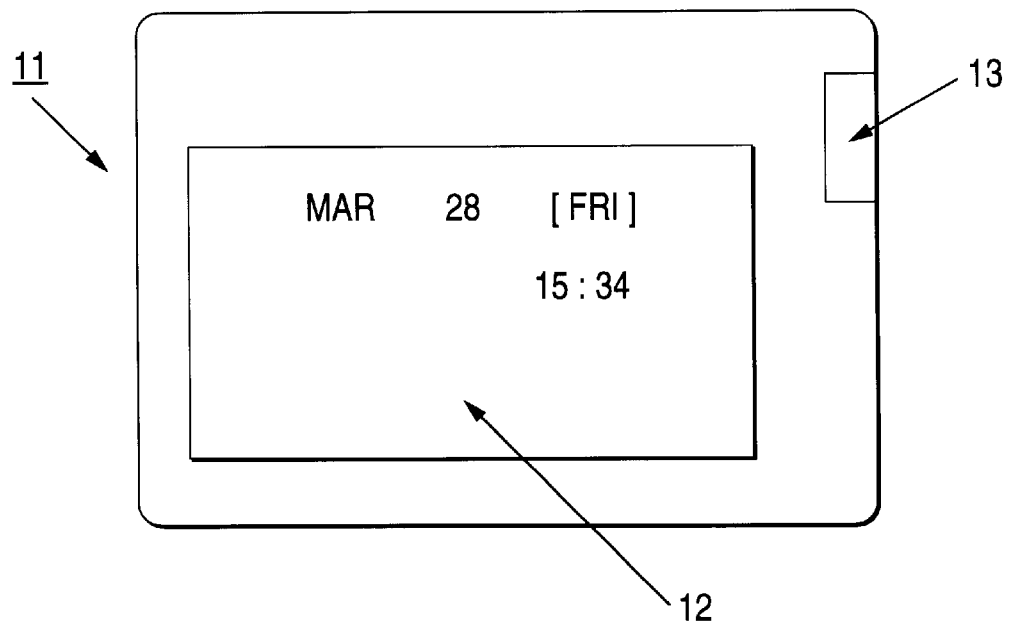
FIGS. 2A and 2B are plan views showing an external appearance and a screen display of the selective calling receiver according to the invention.
Figure 2B:
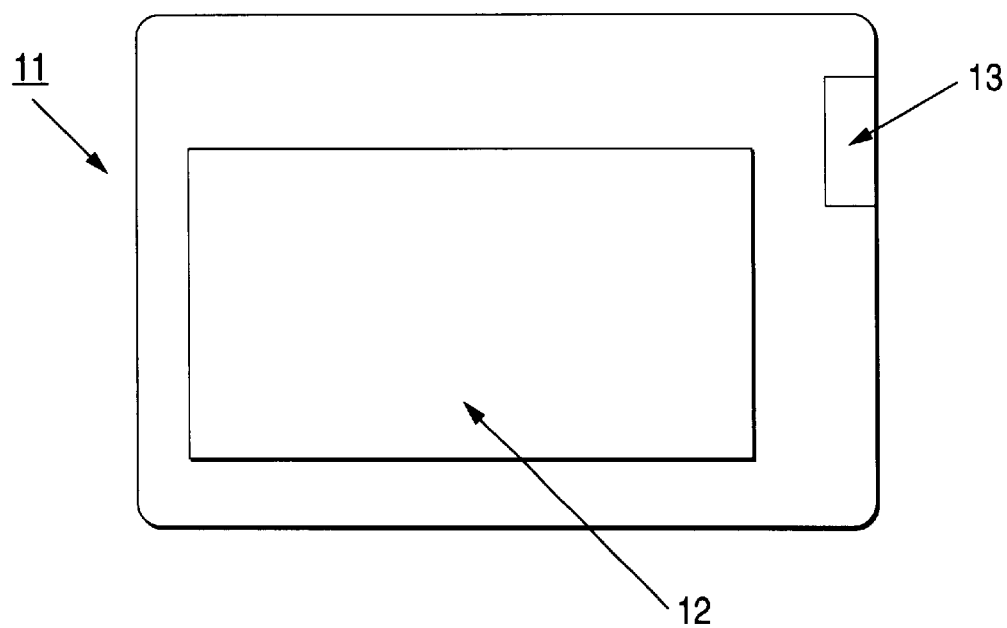

The selective calling receiver of the invention thus constructed is as shown in FIGS. 2A and 2B. In these figures, reference numeral 11 designates the housing of the selective calling receiver; 12, the display screen in the display section 4; 13, a photo-detecting window in which the photo-detector Section 1 is built.

Figure 3A:
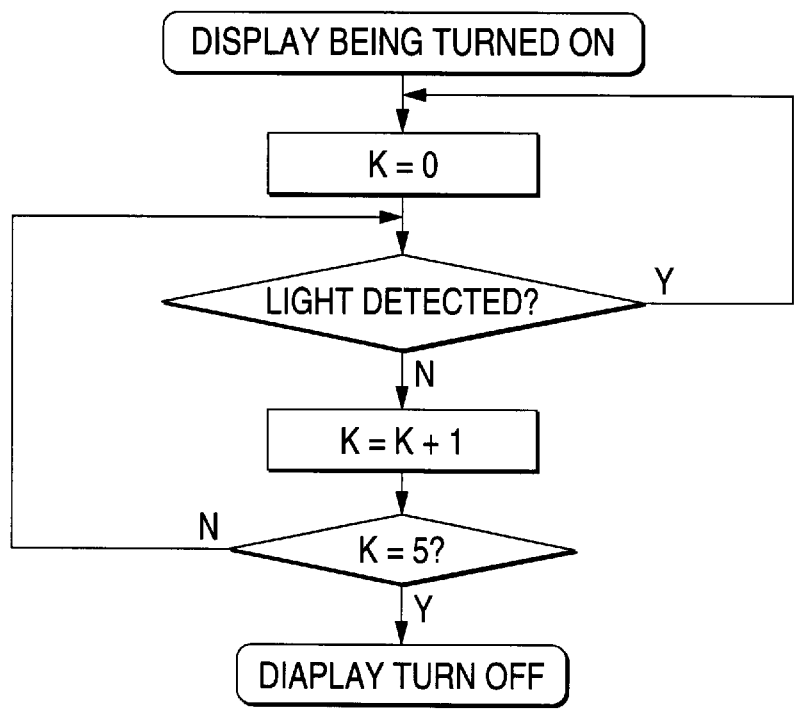
FIGS. 3A and 3B are flow charts for a description of operations of the selective calling receiver according to the invention.
Figure 3B:
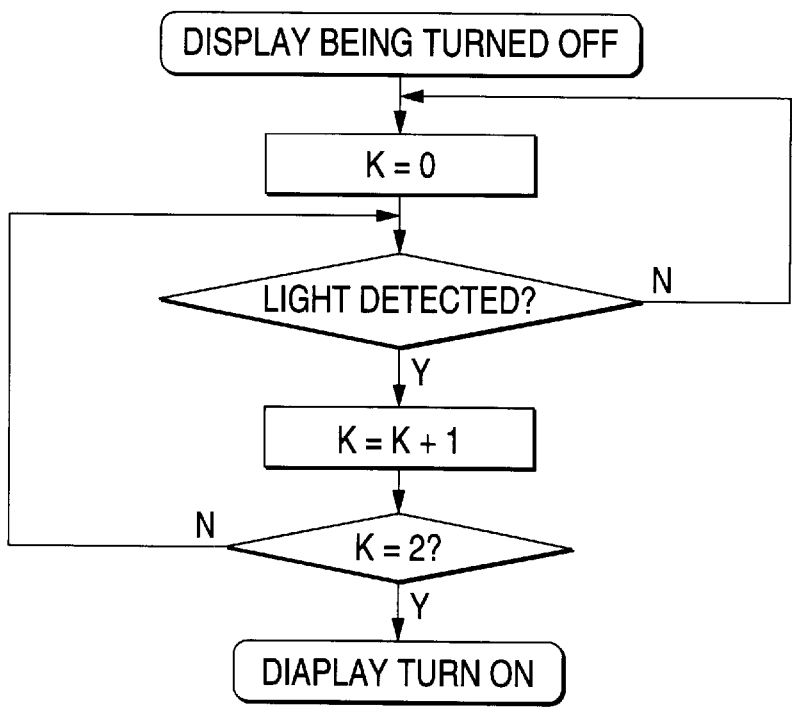
Figure 4A:
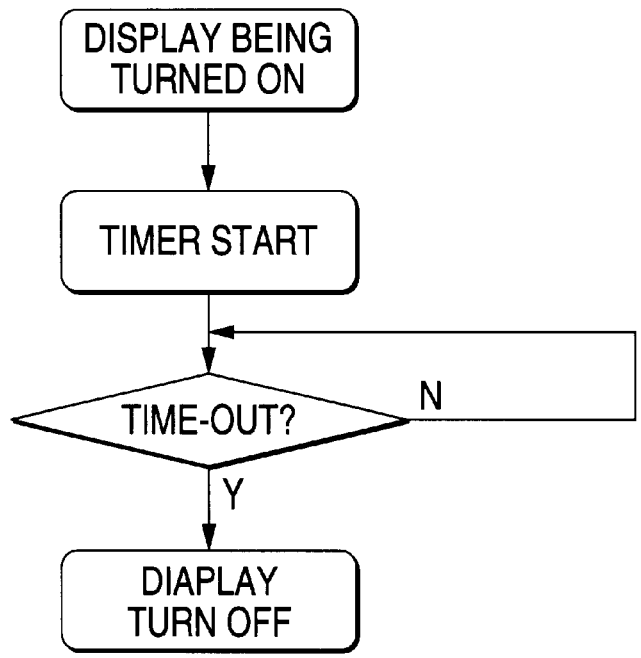
FIGS. 4A and 4B are flow charts for a description of operations of a conventional selective calling receiver.
Figure 4B:
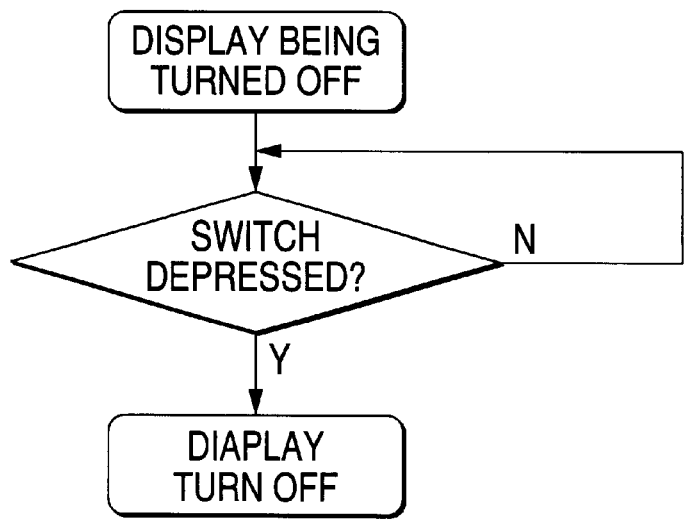

The fundamental operation of the embodiment is as follows:

As long as an external incident light beam is applied through the photo-detecting window 13 to the photo-detector section 1; that is, as long as the incident light beam is detected by the photo-detector 1, as shown in FIG. 2A the screen display is turned on. When the detection of the incident light beam is ceased, as shown in FIG. 2B the screen display is turned off. The above-described operations will be described with reference to flow charts of FIGS. 3A and 3B in more detail.

As was described above, while the incident light beam is being detected by the photo-detector section 1, the screen display is kept turned on as shown in FIG. 2A. When the detection of the incident light beam is ceased, as shown in the flow chart of FIG. 3A the CPU section 2 carries out a photo-detecting operation five times, and when it detects no light beam, the display control section 3 is so controlled as to turn off the screen display, and the display control section 3 is placed in stand-by state. This is, for instance, the case when the user carries the selective calling receive in his pocket or when lights around it are kept turned off; that is, the case where no screen display is required.

Now, let us consider the case where a calling signal reaches the selective calling receiver which is placed in the above-described state, and the user takes it out of his pocket and refers to it. In this case, under the condition that the screen display is turned off as shown in FIG. 2B, it is started to detect an incident light beam through the photo-detecting window 13 which comes from outside, and as shown in the flow chart of FIG. 3B the CPU section 2 performs the photo-detecting operation twice, and when it still detects the incident light beam, the CPU section 2 operates the display control section 3 so that the screen display be turned on; that is, the screen display is automatically turned on. After reading the contents of the calling signal, the user intercepts the incident light beam for instance by placing the selective calling receiver in his pocket. As a result, as was described before, the screen display is automatically turned off.

As was described above, in the embodiment, the screen display is automatically turned on and off according to the detection of the quantity of light of the incident light beam which is applied thereto from outside. That is, it can be effectively achieved to economically use current for the screen display according to the states of use of the selective calling receiver.

As was described above, the screen display is automatically turned on and off in response to the detection of the quantity of light of the incident light beam which is applied to the selective calling receiver from outside. Hence, it is unnecessary for the user to perform a special operation to turn off the screen display, and it can be effectively achieved to economically use current for the screen display according to the states of use of the selective calling receiver.

While there has been described in connection with the preferred embodiment of the invention, it will be obvious to those skilled in the art that various changes and modifications may be made therein without departing from the invention, and it is aimed, therefore, to cover in the appended claim all such changes and modifications as fall within the true spirit and scope of the invention.

What is claimed is:

1. A display unit in a selective calling receiver which has a displaying function, comprising:

photo-detecting means for detecting a quantity of light of an incident light; and display processing means for processing a display action of a display section, said display processing means controlling on-off operation of a screen display of said display section according to a quantity of light detected by said photo-detecting means;

wherein said display processing means turns on the screen display when the incident light is detected by said photo-detecting means, and turns off the screen display when the incident light is undetected, and wherein said display processing means, when the detection of the incident light is ceased, maintains the screen display turned-on while carrying out a photo-detecting operation a predetermined number of times and, if no light is detected, turns off the screen display.

2. A display unit in a selective calling receiver which has a displaying function, comprising:

photo-detecting means for detecting a quantity of light of an incident light; and display processing means for processing a display action of a display section, said display processing means controlling on-off operation of a screen display of said display section according to a quantity of light detected by said photo-detecting means;

wherein said display processing means turns on the screen display when the incident light is detected by said photo-detecting means, and turns off the screen display when the incident light is undetected, and wherein said display processing means, when the incident light is initially detected, maintains the screen display turned-off while carrying out a photo-detecting operation a predetermined number of times and, if the incident light continues to be detected, turns on the screen display.

3. A display unit in a selective calling receiver which has a displaying function, comprising:

photo-detecting means for detecting a quantity of light of an incident light; and display processing means for processing a display action of a display section, said display processing means controlling on-off operation of a screen display of said display section according to a quantity of light detected by said photo-detecting means;

wherein said display processing means turns on the screen display when the incident light is detected by said photo-detecting means, and turns off the screen display when the incident light is undetected, wherein said display processing means, when the detection of the incident light is ceased, maintains the screen display turned-on while carrying out a photo-detecting operation a predetermined number of times and, if no light is detected, turns off the screen display, and wherein said display processing means, when the incident light is initially detected, maintains the screen display turned-off while carrying out a photo-detecting operation a predetermined number of times and, if the incident light continues to be detected, turns on the screen display.

* * * * *